United States Patent
Fujii et al.

(10) Patent No.: US 11,315,414 B2
(45) Date of Patent: Apr. 26, 2022

(54) INFORMATION PROCESSING DEVICE, VEHICLE POSITION CONTROL SYSTEM, AND VEHICLE POSITION CONTROL METHOD

(71) Applicant: TOYOTA JIDOSHA KABUSHIKI KAISHA, Toyota (JP)

(72) Inventors: Shinichiro Fujii, Kawasaki (JP); Hiroe Fukui, Toyohashi (JP); Takashi Goto, Okazaki (JP); Tatsuya Shigekiyo, Okazaki (JP); Kuniaki Jinnai, Nagoya (JP); Naoto Sasagawa, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/719,239

(22) Filed: Dec. 18, 2019

(65) Prior Publication Data
US 2020/0234573 A1     Jul. 23, 2020

(30) Foreign Application Priority Data

Jan. 17, 2019   (JP) .............................. JP2019-006050

(51) Int. Cl.
   *G08G 1/01*    (2006.01)
   *G05D 1/02*    (2020.01)
   *G06K 9/00*    (2022.01)
   *G05D 1/00*    (2006.01)

(52) U.S. Cl.
   CPC ......... *G08G 1/0141* (2013.01); *G05D 1/0027* (2013.01); *G05D 1/0238* (2013.01); *G05D 1/0289* (2013.01); *G06K 9/00362* (2013.01); *G06K 9/00805* (2013.01)

(58) Field of Classification Search
   CPC .. G08G 1/0141; G05D 1/0238; G05D 1/0027; G05D 1/0289; G05D 2201/0213; G05D 1/0297; G05D 1/0251; G05D 1/0255; G05D 1/0257; G05D 1/0214; G05D 1/0278; G05D 1/028; G05D 1/0276; G05D 2201/0212; G06K 9/00362; G06K 9/00805; G06K 9/00791; G06K 9/00778
   See application file for complete search history.

(56) References Cited

U.S. PATENT DOCUMENTS

2018/0095474 A1\*  4/2018  Batu ....................... G01S 19/48

FOREIGN PATENT DOCUMENTS

JP       2010-143558 A      7/2010
JP       2019189064 A   \*  10/2019

\* cited by examiner

*Primary Examiner* — James J Lee
*Assistant Examiner* — Shon G Foley
(74) *Attorney, Agent, or Firm* — Oblon, McClelland, Maier & Neustadt, L.L.P.

(57) ABSTRACT

An information processing device includes a control unit configured to perform: acquiring a degree of congestion of persons that are located in a predetermined range including a plurality of vehicles which is parked at predetermined positions and is able to travel autonomously; determining a positional relationship between the plurality of vehicles based on the degree of congestion; and transmitting a movement command to a first vehicle which is a vehicle which is requested to move out of the plurality of vehicles such that the determined positional relationship is satisfied.

6 Claims, 9 Drawing Sheets

| DEGREE OF CONGESTION | AVERAGE NUMBER OF PERSONS APPEARING | VEHICLE COLUMN INTERVAL |
|---|---|---|
| S | 50 PERSONS OR MORE | 5 m |
| A | 30 PERSONS TO 49 PERSONS | 4 m |
| B | 15 PERSONS TO 29 PERSONS | 3.5 m |
| C | 14 PERSONS OR LESS | 3 m |

FIG. 5

| DEGREE OF CONGESTION | AVERAGE NUMBER OF PERSONS APPEARING | VEHICLE COLUMN INTERVAL |
|---|---|---|
| S | 50 PERSONS OR MORE | 5 m |
| A | 30 PERSONS TO 49 PERSONS | 4 m |
| B | 15 PERSONS TO 29 PERSONS | 3.5 m |
| C | 14 PERSONS OR LESS | 3 m |

INFORMATION PROCESSING DEVICE, VEHICLE POSITION CONTROL SYSTEM, AND VEHICLE POSITION CONTROL METHOD

INCORPORATION BY REFERENCE

The disclosure of Japanese Patent Application No. 2019-006050 filed on Jan. 17, 2019 including the specification, drawings and abstract is incorporated herein by reference in its entirety.

BACKGROUND

1. Technical Field

The disclosure relates to an information processing device, a vehicle position control system, and a vehicle position control method.

2. Description of Related Art

Use of a vehicle as a mobile shop or a booth in an exhibition hall has been proposed (for example, Japanese Patent Application Publication No. 2010-143558 (JP 2010-143558 A)).

SUMMARY

For example, when a vehicle is used as a mobile shop, a plurality of vehicles can be collectively disposed in a predetermined area to form a shopping mall. However, a burden may be imposed on movement of guests depending on a positional relationship between the vehicles serving as shops.

An aspect of the present disclosure provides an information processing device, a vehicle position control system, and a vehicle position control method that can enhance efficiency of movement between a plurality of vehicles which can travel autonomously when the plurality of vehicles is arranged at predetermined positions in a predetermined area.

According to an aspect of the disclosure, there is provided an information processing device including a control unit configured to perform: acquiring a degree of congestion of persons that are located in a predetermined range including a plurality of vehicles which is parked at predetermined positions and is able to travel autonomously; determining a positional relationship between the plurality of vehicles based on the degree of congestion; and transmitting a movement command to a first vehicle which is a vehicle which is requested to move out of the plurality of vehicles such that the determined positional relationship is satisfied.

According to another aspect of the disclosure, there is provided a vehicle position control system including: a plurality of vehicles which is parked at predetermined positions in a predetermined range and is able to travel autonomously; and an information processing device including a control unit configured to perform: acquiring a degree of congestion of persons that are located in the predetermined range; determining a positional relationship between the plurality of vehicles based on the degree of congestion; and transmitting a movement command to a first vehicle which is a vehicle which is requested to move out of the plurality of vehicles such that the determined positional relationship is satisfied.

According to still another aspect of the disclosure, there is provided a vehicle position control method including: acquiring a degree of congestion of persons that are located in a predetermined range including a plurality of vehicles which is parked at predetermined positions and is able to travel autonomously; determining a positional relationship between the plurality of vehicles based on the degree of congestion; and transmitting a movement command to a first vehicle which is a vehicle which is requested to move out of the plurality of vehicles such that the determined positional relationship is satisfied.

According to the disclosure, it is possible to enhance efficiency of movement between a plurality of vehicles which can travel autonomously when the plurality of vehicles is arranged at predetermined positions in a predetermined area.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating an example of a congestion degree table which is stored in a congestion degree database of the central server;

DETAILED DESCRIPTION OF EMBODIMENTS

Figure 1:
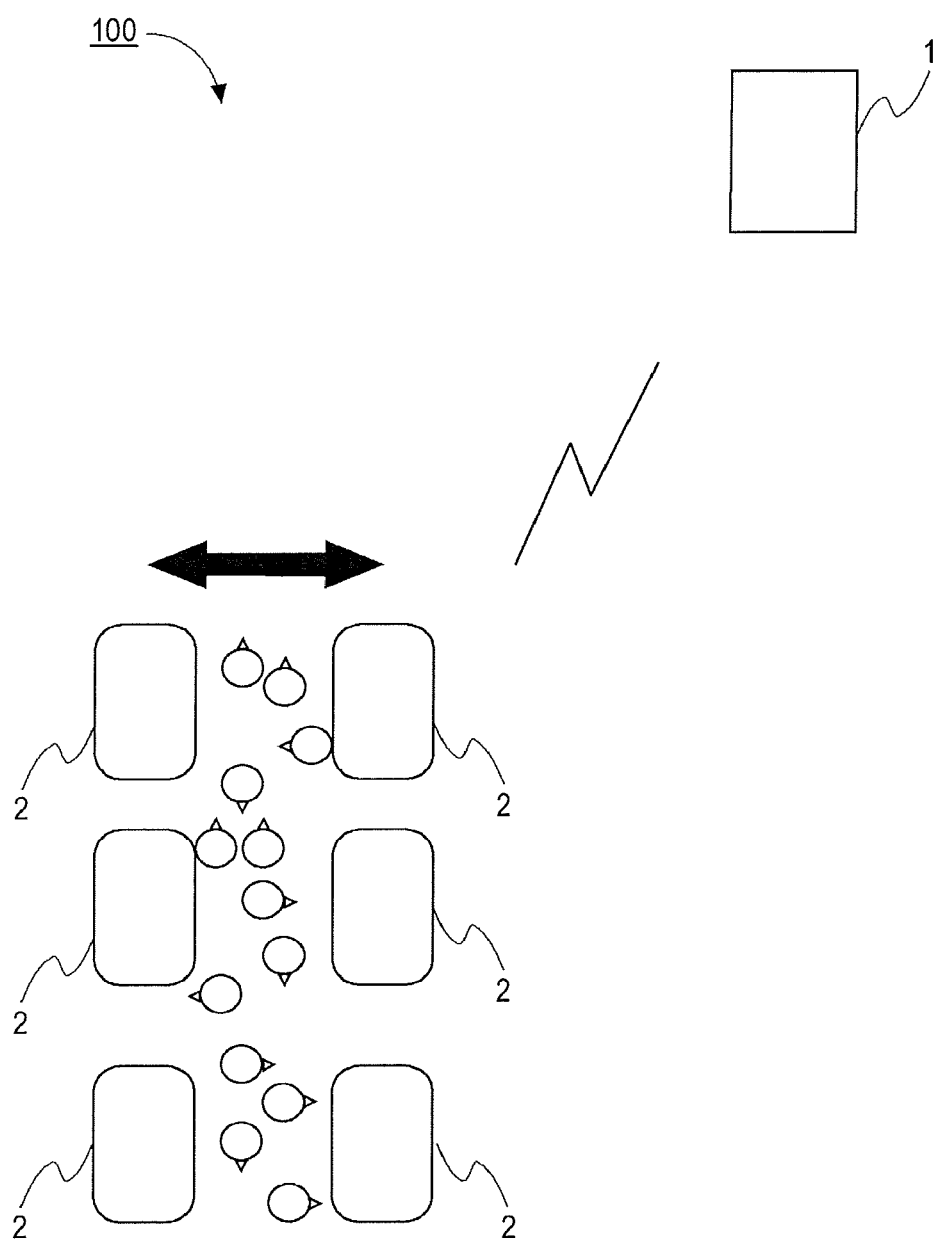
FIG. 1 is a diagram illustrating an example of a system configuration of a vehicle position control system according to a first embodiment.

An aspect of the disclosure provides an information processing device including a control unit configured to perform: acquiring a degree of congestion of persons that are located in a predetermined range including a plurality of vehicles which is parked at predetermined positions and is able to travel autonomously; determining a positional relationship between the plurality of vehicles based on the degree of congestion; and transmitting a movement command to a first vehicle which is a vehicle which is requested to move out of the plurality of vehicles such that the determined positional relationship is satisfied.

For example, the plurality of vehicles is, for example, mobile shops or mobile exhibition rooms and collectively gathers in a predetermined range to form a shopping mall or an exhibition hall. In this case, since the positional relationship between the vehicles is determined based on the degree of congestion, the positional relationship between the vehicles also changes when the degree of congestion changes. Accordingly, it is possible to enhance efficiency of movement of vehicles.

In an aspect of the disclosure, the control unit of the information processing device may be configured to determine the positional relationship such that intervals between the plurality of vehicles increase when the degree of congestion increases and to determine the positional relationship such that the intervals between the plurality of vehicles decrease when the degree of congestion decreases. Since the intervals between the vehicles increase when the degree of congestion increases, a density of persons decreases and persons can easily walk between the vehicles. On the other hand, since the intervals between the vehicles decrease when the degree of congestion decreases, the vehicles become closer to each other and moving distances between the vehicles can be decreased. Accordingly, it is possible to reduce a burden on movement between the vehicles.

In an aspect of the disclosure, the control unit of the information processing device may be configured to notify of at least movement of the first vehicle using a predetermined alarm unit. Each of the plurality of vehicles may include an obstacle sensor, and the control unit may be configured to perform: determining whether there is an obstacle in a moving direction using the obstacle sensor before starting movement in response to the movement command; and starting movement to a position which is designated by the movement command when it is determined that there is no obstacle in the moving direction. Examples of the obstacle include a person, a bicycle, a rack, a building, and a structure. Accordingly, it is possible to secure safety in movement of a vehicle.

An aspect of the disclosure can also be embodied as a vehicle position control system and a vehicle position control method. A vehicle position control system includes: a plurality of vehicles which is parked at predetermined positions in a predetermined range and is able to travel autonomously; and the above-mentioned information processing device. A vehicle position control method includes: acquiring a degree of congestion of persons that are located in a predetermined range including a plurality of vehicles which is parked at predetermined positions and which is able to travel autonomously; determining a positional relationship between the plurality of vehicles based on the degree of congestion; and transmitting a movement command to a first vehicle which is a vehicle which is requested to move out of the plurality of vehicles such that the determined positional relationship is satisfied. The technical spirit which is disclosed in the information processing method can also be applied to the vehicle position control system and the vehicle position control method as long as no technical contradictions arise.

Hereinafter, embodiments of the disclosure will be described with reference to the accompanying drawings. The configurations of the following embodiments are only examples and the disclosure is not limited to the configurations of the embodiments.

First Embodiment

Outline of System

FIG. 1 is a diagram illustrating an example of a system configuration of a vehicle position control system 100 according to a first embodiment. The vehicle position control system 100 is a system that controls a positional relationship between a plurality of vehicles which is arranged in a predetermined range based on a degree of congestion. The vehicle position control system 100 includes a plurality of vehicles 2 and a central server 1 that controls a positional relationship between the plurality of vehicles 2. The central server 1 is an example of an "information processing device."

Each vehicle 2 is, for example, a vehicle that can travel by automated driving and by unmanned driving. In the first embodiment, each of a plurality of vehicles 2 is assumed to be a mobile shop such as a clothing store, a variety store, a shoe store, a flower shop, and a foodstuff store, and a plurality of mobile shops collectively gather to form a mobile shopping mall. In the following description, a predetermined range in which mobile shopping malls are formed is referred to as a site. Here, it is assumed that a site refers to a range including a plurality of vehicles 2 and the surroundings thereof.

The plurality of vehicles 2 is parked based on a predetermined positional relationship such that pedestrians can walk around easily. In the example illustrated in FIG. 1, the vehicles 2 are arranged in two columns. The two columns of the vehicles 2 are arranged with a predetermined distance therebetween. The vehicles 2 included in the two columns are disposed such that shop surfaces thereof face each other. Accordingly, the plurality of vehicles 2 illustrated in FIG. 1 forms a passage.

Each of the plurality of vehicles 2 is connected to the central server 1, for example, via a radio communication network. For example, each of the plurality of vehicles 2 may be connected to the Internet via a radio communication network and may be connected to the central server 1 via the Internet. Each vehicle 2 performs, for example, mobile communication such as 3G Long Term Evolution (LTE), or LTE-Advanced or radio communication based on a standard of a wireless LAN such as WiFi.

Each vehicle 2 receives an operation command from the central server 1, makes an operation plan, and travels autonomously to a destination in accordance with the operation plan. The vehicle 2 includes a unit that acquires position information, acquires position information at intervals of a predetermined period, and transmits the acquired position information to the central server 1.

The central server 1 controls a positional relationship between the vehicles 2 that form a mobile shopping mall based on a degree of congestion. A degree of congestion is, for example, the number of persons which are located in a predetermined area. The central server 1 acquires a degree of congestion at intervals of a predetermined period. The degree of congestion is acquired, for example, based on a result of measurement of the number of attendees at an entry port of the site, a result of image analysis of images which are captured in the site using a camera, the number of terminals accessing an WiFi access point, and the number of visitors who are registered in advance.

For example, when the degree of congestion increases and becomes equal to or greater than a predetermined threshold value, the central server 1 determines an arrangement of the plurality of vehicles 2 such that a width of a passage which is formed by the vehicles 2 in two columns increases. For example, when the degree of congestion decreases and becomes less than the predetermined threshold value, the central server 1 determines an arrangement of the plurality of vehicles 2 such that the width of the passage which is formed by the vehicles 2 in two columns decreases. The central server 1 transmits a movement command to the vehicles 2 which need to move based on the determined arrangement.

Each vehicle 2 receives a movement command from the central server 1, calculates a moving route to a designated position, and then moves. The vehicle 2 starts movement after ascertaining that there is no obstacle in a moving direction before movement. Examples of the obstacle include persons.

In the first embodiment, the positional relationship between the vehicles 2 which are mobile shops changes according to change in the degree of congestion in the site. For example, the width of a passage which is formed by the vehicles 2 increases when the degree of congestion increases, and the width of a passage which is formed by the vehicles 2 decreases when the degree of congestion decreases. For example, when the number of persons is small, the persons can efficiently walk around the shops in a case in which the mobile shops are close to each other. On the other hand, when the number of persons is large, the intervals between the mobile shops are increased such that the persons can easily walk. In this way, in the first embodiment, since the positional relationship between the vehicles 2 changes according to change in the degree of congestion in the site, it is possible to reduce a burden on movement between the vehicles 2 and to enhance efficiency of movement between the vehicles 2.

Figure 2:
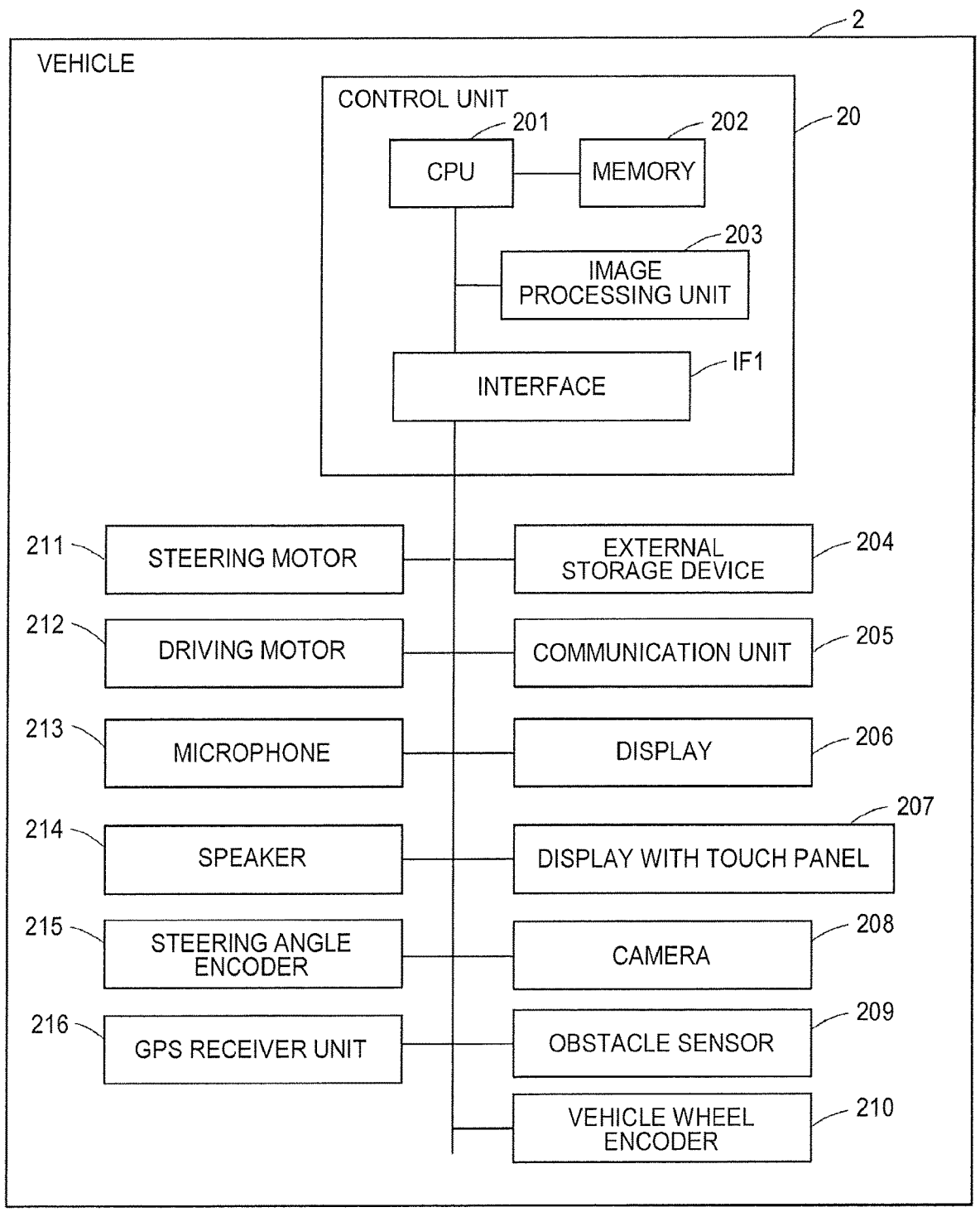
FIG. 2 is a diagram illustrating an example of a hardware configuration of a vehicle.

FIG. 2 is a diagram illustrating an example of a hardware configuration of a vehicle 2. In FIG. 2, it is assumed that the vehicle 2 is a vehicle which can travel autonomously. In FIG. 2, hardware associated with a control system is extracted and illustrated.

The vehicle 2 includes a control unit 20, an external storage device 204, a communication unit 205, a display 206, a display 207 with a touch panel, a camera 208, an obstacle sensor 209, a vehicle wheel encoder 210, a steering motor 211, a driving motor 212, a microphone 213, a speaker 214, a steering angle encoder 215, and a Global Positioning System (GPS) receiver unit 216.

The control unit 20 is also referred to as an electronic control unit (ECU). The control unit 20 includes a CPU 201, a memory 202, an image processing unit 203, and an interface IF1. The external storage device 204, the communication unit 205, the display 206, the display 207 with a touch panel, the camera 208, the obstacle sensor 209, the vehicle wheel encoder 210, the steering motor 211, the driving motor 212, the microphone 213, the speaker 214, the steering angle encoder 215, and the GPS receiver unit 216 are connected to the interface IF1.

The obstacle sensor 209 is, for example, an ultrasonic sensor or a radar. The obstacle sensor 209 emits ultrasonic waves, radio waves, or the like in a detection direction and detects the presence, position, relative speed, and the like of an obstacle in the detection direction based on reflected waves. Examples of the obstacle include a pedestrian, a bicycle, a structure, and a building. For example, when the vehicle 2 has a box-shaped body, the vehicle 2 includes a plurality of obstacle sensors 209 and the plurality of obstacle sensors 209 is provided at positions close to four corners on front, rear, right, and left sides of the vehicle 2. Front, rear, right, and left sides of the vehicle 2 are determined, for example, depending on a traveling direction thereof.

The camera 208 is an imaging device using an image sensor such as a charge-coupled device (CCD) or a metal-oxide semiconductor (MOS) or complementary metal-oxide-semiconductor (CMOS). The camera 208 acquires an image at intervals of a predetermined time which is called a frame period and stores the acquired images in a frame buffer in the control unit 20. The vehicle 2 includes a plurality of cameras 208, and the plurality of cameras 208 is provided, for example, on the surfaces of the front, rear, right, and left sides of the vehicle 2 to face the outside. Here, the disclosure is not limited thereto and the camera 208 may include a camera that is provided to face the inside of the vehicle.

The steering motor 211 controls a direction of a cross line at which a rotary plane of a vehicle wheel and a horizontal plane cross each other, that is, an angle which is a traveling direction based on rotation of the vehicle wheel, in accordance with an instruction signal from the control unit 20. The driving motor 212 drives and rotates, for example, four vehicle wheels of the vehicle 2 in accordance with an instruction signal from the control unit 20. Here, the driving motor 212 may drive a pair of vehicle wheels out of two front and rear pairs of vehicle wheels.

The steering angle encoder 215 detects a steering angle which is the traveling direction of the vehicle wheels at intervals of a predetermined detection time and stores the detected steering angle in a register of the control unit 20. A steering angle is an angle of a rotation shaft of a vehicle wheel in the horizontal plane. For example, an origin of the angle is set in a direction perpendicular to the rotation shaft of the vehicle wheel with respect to the traveling direction of the vehicle 2. The vehicle wheel encoder 210 acquires a rotary angle of the vehicle wheel at intervals of a predetermined detection time and stores the acquired rotary angle in the register of the control unit 20.

The communication unit 205 is, for example, a communication unit that accesses an access point of WiFi or a mobile phone base station and communicates with various servers over a network via a public communication circuit network connected thereto. The communication unit 205 performs radio communication in a radio signal and radio communication mode supporting a predetermined radio communication standard.

The GPS receiver unit 216 receives radio waves of time signals from a plurality of global positioning satellites which orbit the Earth and stores the received time signals in the register in the control unit 20. The microphone 213 detects voice, converts the detected voice into a digital signal, and stores the digital signal in the register in the control unit 20. The speaker 214 is activated by the control unit 20 or a D/A converter and an amplifier which are connected to a signal processing unit and reproduces sound including sound and voice. The microphone 213 and the speaker 214 may include a microphone and a speaker which are provided to face the inside of the vehicle 2 and a microphone and a speaker which are provided to face outside from the vehicle 2.

For example, the display 206 is provided on the side surfaces of the body of the vehicle 2 to face outside from the vehicle 2. Examples of the display 206 include a liquid crystal display and an electroluminescence panel. The display 207 with a touch panel is an input device to which a user inputs an instruction and is provided, for example, to face the inside of the vehicle 2. The disclosure is not limited thereto and, for example, the display 207 with a touch panel may be provided in the vicinity of a door of the vehicle 2 to face outside from the vehicle 2.

The CPU 201 of the control unit 20 executes a computer program which is loaded into the memory 202 and performs processes of the control unit 20. The memory 202 stores a computer program which is executed by the CPU 201, data which is processed by the CPU 201, and the like. Examples of the memory 202 include a dynamic random access memory (DRAM), a static random access memory (SRAM), and a read only memory (ROM). The image processing unit 203 processes data in the frame buffer which is acquired at intervals of a predetermined frame period from the camera 208 in cooperation with the CPU 201. The image processing unit 203 includes, for example, a GPU and an image memory which serves as a frame buffer. The external storage device 204 is a nonvolatile storage device and examples thereof include a solid state drive (SSD) and a hard disk drive.

For example, the control unit 20 acquires detection signals from the sensors on various parts of the vehicle 2 via the interface IF1. The control unit 20 calculates a latitude and longitude indicating a position on the earth based on the detection signal from the GPS receiver unit 216. In addition, the control unit 20 acquires map data from a map information database which is stored in the external storage device 204, compares the calculated latitude and longitude with a position in the map data, and determines a current position. The control unit 20 acquires a route from the current position to a destination in the map data. The control unit 20 detects an obstacle near the vehicle 2 based on the signals from the obstacle sensor 209, the camera 208, and the like, determines the traveling direction to avoid the obstacle, and controls the steering angle.

The control unit 20 processes images acquired from the camera 208 for each piece of frame data in cooperation with the image processing unit 203, detects, for example, change based on a difference between the images, and recognizes an obstacle. The control unit 20 may transmit frame data of the images from the camera 208 and voice data acquired from the microphone 213 from the communication unit 205 to the central server 1 over the network. Then, analysis of the frame data of the images and the voice data may be shared by the central server 1.

In addition, the control unit 20 displays an image, characters, and other information on the display 206. The control unit 20 detects an operation on the display 207 with a touch panel and receives an instruction from a user.

In FIG. 2, the interface IF1 is illustrated, but transmission and reception of signals between the control unit 20 and a control object is not limited to the interface IF1. That is, the control unit 20 may have a plurality of signal transmission paths other than the interface IF1. In FIG. 2, the control unit 20 includes a single CPU 201. Here, the CPU is not limited to a single processor and may have a multi-processor configuration. A single CPU which is connected to a single socket may have a multi-core configuration. At least some processes of the units may be performed by a processor other than the CPU, for example, a dedicated processor such as a digital signal processor (DSP) or a graphics processing unit (GPU). At least some processes of the units may be performed by an integrated circuit (IC) or another digital circuit. An analog circuit may be included as at least a part of each unit.

Figure 3:
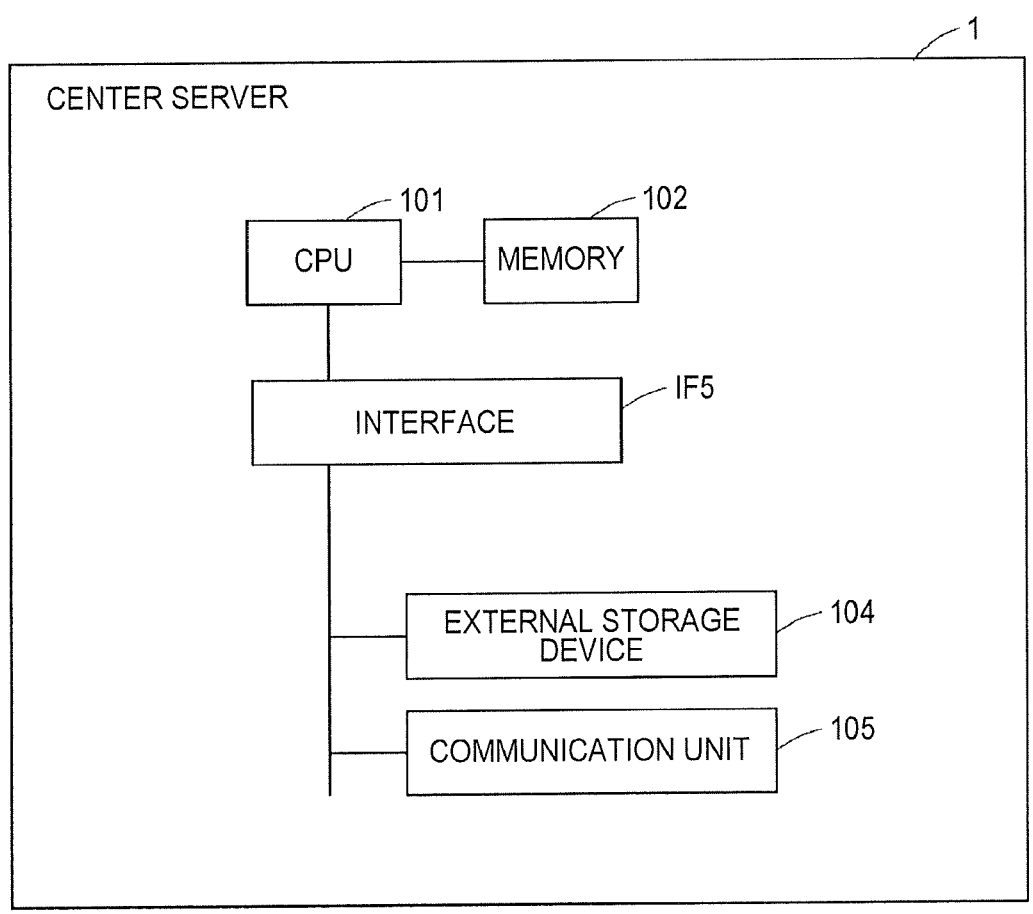
FIG. 3 is a diagram illustrating a hardware configuration of a central server.

FIG. 3 is a diagram illustrating a hardware configuration of the central server 1. The central server 1 includes a CPU 101, a memory 102, an interface IF5, an external storage device 104, and a communication unit 105. The configurations and operations of the CPU 101, the memory 102, the interface IF5, and the external storage device 104 are the same as those of the CPU 201, the memory 202, the interface iF1, and the external storage device 204 which are illustrated in FIG. 2. The CPU 101 is an example of a "control unit."

The communication unit 105 accesses, for example, a public communication circuit network via a LAN and communicates with various servers and vehicles 2 over the network via the public communication circuit network. Alternatively, when the central server 1 is set to control only the vehicles 2 in the site and is located in the site, the central server 1 may be a mobile PC. In this case, the communication unit 105 performs radio communication, for example, in a radio signal and radio communication mode supporting a standard of WiFi, accesses an access point of WiFi, and communicates with vehicles 2 which are connected to the network of WiFi.

The disclosure is not limited thereto. When the central server 1 is a mobile PC, the communication unit 105 may access a mobile phone base station or an access point in a predetermined radio communication mode, access a public communication circuit network via them, and communicate with other devices over the network. The hardware configuration of the central server 1 is not limited to that illustrated in FIG. 3 and can be appropriately subjected to additions or substitutions depending on embodiments.

Figure 4:
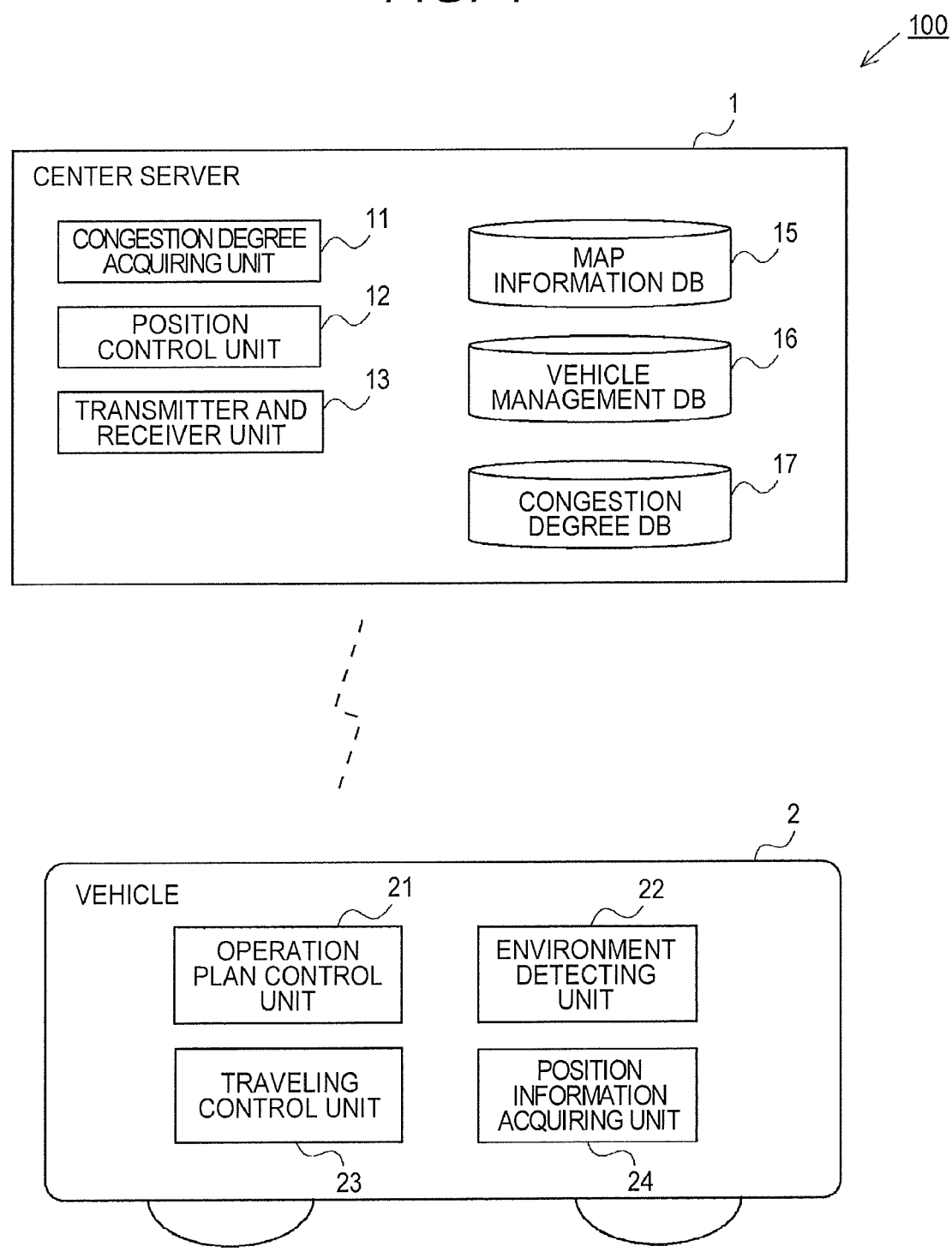
FIG. 4 is a diagram illustrating an example of functional configurations of the central server and the vehicle in the vehicle position control system.

FIG. 4 is a diagram illustrating an example of functional configurations of the central server 1 and the vehicle 2 in the vehicle position control system 100. The central server 1 operates as various units which are illustrated in FIG. 4 in accordance with a computer program in the memory 102. That is, the central server 1 includes a congestion degree acquiring unit 11, a position control unit 12, a transmitter and receiver unit 13, a map information database (DB) 15, a vehicle management DB 16, and a congestion degree DB 17 as functional elements.

The transmitter and receiver unit 13 is an interface with vehicles 2 and various servers. The transmitter and receiver unit 13 appropriately outputs information received via the communication unit 105 to the congestion degree acquiring unit 11 or the position control unit 12. The transmitter and receiver unit 13 transmits information input from the congestion degree acquiring unit 11 or the position control unit 12 to a designated destination via the communication unit 105.

The congestion degree acquiring unit 11 acquires, for example, a degree of congestion in the overall site at intervals of a predetermined period. The congestion degree acquiring unit 11 stores the acquired degree of congestion in a predetermined storage area of the memory 102. For example, degrees of congestion which are acquired in a predetermined period are stored in the predetermined storage area of the memory 102 and degrees of congestion after a predetermined period are sequentially deleted therefrom. A degree of congestion is acquired with reference to a congestion degree table which is stored in the congestion degree DB 17 which will be described later, for example, using one or more pieces of the following information. The period in which a degree of congestion is acquired is set, for example, in the unit of one minute to one hour.

(1) An image analyzing process may be performed on an image captured by a camera which is provided at a predetermined position in the site or the camera 208 which is provided to face outside from the vehicle 2 and a degree of congestion may be acquired using the number of persons which is acquired at a result and who appears in the captured image. In this case, the congestion degree acquiring unit 11 receives a captured image from the camera provided at a predetermined position in the site or the camera 208 provided to face outside from the vehicle 2 via the transmitter and receiver unit 13 at intervals of a predetermined period. For example, when there is a plurality of cameras which is used to acquire a degree of congestion, imaging ranges of the cameras are adjusted to have the same size and an average number of persons who appear in the captured images of the cameras is used as a degree of congestion. When the camera 208 of the vehicle 2 is used, image analysis may be performed by the vehicle 2 and the number of persons who appears in the captured image may be transmitted to the central server 1.

(2) A degree of congestion may be acquired using the number of terminals in the site which is acquired from position information of an access point of WiFi provided in the site or a mobile phone base station of each communication provider. In this case, the congestion degree acquiring unit 11 acquires the number of terminals in the site from the access point or a server of each communication provider via the transmitter and receiver unit 13 at intervals of a predetermined period.

(3) The degree of congestion may be acquired using the number of attendees which is measured at entry and exit ports of the site. For example, the number of attendees per predetermined unit time or a value which is obtained by subtracting the number of leaving persons from the number of attendees which is accumulated from an opening time is used as the degree of congestion. The number of attendees and the number of leaving persons at the entry and exit ports are acquired from measurement by a party concerned or entry and exit records by near field communication (NFC) devices which are provided at the entry and exit ports. In this case, the congestion degree acquiring unit 11 acquires the number of attendees and the number of leaving persons, for example, from a terminal which is carried by a party concerned or the NFC devices which stores entry and exit records via the transmitter and receiver unit 13.

(4) For example, when reservation is required for entrance into the mobile shopping mall, the central server 1 may receive information on reservation for entrance from a server which stores information on the reservation for entrance, acquire the current number of visitors from the information on the reservation for entrance, and acquire a degree of congestion from the number of visitors.

The position control unit 12 performs a vehicle position control process routine at intervals of a predetermined period. The vehicle position control process routine is a process of controlling a positional relationship between a plurality of vehicles 2 in a site. An execution period of the vehicle position control process routine is arbitrarily set, for example, in a unit of 10 minutes to 1 hour.

Specifically, the position control unit 12 acquires, for example, a latest degree of congestion from a predetermined storage area of the memory 102 when it is time to perform the vehicle position control process routine. The position control unit 12 determines a positional relationship between the vehicles 2 in the site, for example, based on the latest degree of congestion. For example, the positional relationship between the vehicles 2 is determined such that intervals between the vehicles 2 increase as the degree of congestion increases and the intervals between the vehicles 2 decrease as the degree of congestion decreases. The positional relationship between vehicles 2 includes the intervals between the vehicles 2, a direction of one or more vehicles 2 with respect to one or more other vehicles 2, and a shape which is a plurality of vehicles 2 as a whole. The position control unit 12 determines a layout drawing of the vehicles 2, for example, with reference to the map information DB 15 and the vehicle management DB 16 which will be described later such that the determined positional relationship between the vehicles 2 is satisfied.

The position control unit 12 transmits a movement command to vehicles 2 of which a position, a direction, or the like need to change such that the determined positional relationship between the vehicles 2 is satisfied. Regarding the vehicles 2 of which a position, a direction, or the like need to change, the vehicles 2 of which a position, a direction, or the like is to change are determined, for example, by comparing the current layout drawing of the vehicles 2 with a layout drawing which is newly prepared. For example, the movement command includes position information and a direction of a destination of movement.

When there is any vehicle 2 which is to move, the position control unit 12 broadcasts that the vehicle 2 moves from speakers provided in the site, speakers 214 of the vehicles 2, or speakers 214 provided in the vehicles 2 moving in the site and the surrounding vehicles 2 thereof. The speakers provided in the site, the speakers 214 of the vehicles 2, and the speakers 214 provided in the vehicles 2 moving in the site and the surrounding vehicles 2 thereof are an example of an "alarm unit."

The map information DB 15, the vehicle management DB 16, and the congestion degree DB 17 are prepared in the external storage device 104 of the central server 1. The map information DB 15, the vehicle management DB 16, and the congestion degree DB 17 are, for example, relational databases.

For example, map information in the site and history information of the layout drawing of the vehicles 2 in the site are stored in the map information DB 15. Patterns of the positional relationship between the vehicles 2 based on the degree of congestion may be stored in advance in the map information DB 15. For example, information such as identification information, sizes, and applications of the vehicles 2 in the site are stored in the vehicle management DB 16. A congestion degree table in which a degree of congestion is defined is stored in the congestion degree DB 17. Details of the congestion degree table will be described later.

Some functional units or some processes of the central server 1 may be embodied by another computer which is connected to the network. A series of processes which are performed by the central server 1 may be embodied in hardware or may be embodied in software.

A vehicle 2 operates as the units illustrated in FIG. 4 in accordance with a computer program in a memory. For example, the vehicle 2 includes an operation plan control unit 21, an environment detecting unit 22, a travel control unit 23, and a position information acquiring unit 24 as functional units. The operation plan control unit 21, the environment detecting unit 22, the travel control unit 23, and the position information acquiring unit 24 are, for example, functional units which are embodied by causing the CPU 201 to execute a program in the memory 202.

The position information acquiring unit 24 acquires, for example, position information of the vehicle 2 which is acquired by a GPS receiver unit 216 or the like at intervals of a predetermined period and transmits the acquired position information to the central server 1. The position information of the vehicle 2 is, for example, latitude and longitude. Alternatively, the position information of the vehicle 2 may be, for example, an address. The position information of the vehicle 2 which is acquired by the position information acquiring unit 24 is also output to, for example, the operation plan control unit 21 and the travel control unit 23.

The operation plan control unit 21 receives an operation command and a movement command from the central server 1. The operation plan control unit 21 calculates a route on which the vehicle 2 is to travel based on the position information of the host vehicle acquired by the position information acquiring unit 24 and creates an operation plan. The operation plan includes data on the calculated route on which the vehicle 2 is to travel and data in which processes which are to be performed by the vehicle 2 in a part or a whole of the route are defined. An example of the process which is to be performed by the vehicle 2 is change of a direction of the vehicle 2. The operation plan control unit 21 outputs the created operation plan to the travel control unit 23.

The environment detecting unit 22 detects environment information around the vehicle 2 which is used to travel autonomously based on data which is acquired by various sensors mounted in the vehicle 2. Examples of an object which is to be detected by the environment detecting unit 22 include information such as the number or positions of lanes, the number or positions of vehicles which are located near the host vehicle, the number or positions of obstacles (for example, pedestrians, bicycles, structures, or buildings) which are located near the host vehicle, a structure of a road, and road signs. The object to be detected is not limited thereto. The object to be detected is not particularly limited as long as it is used to perform autonomous travel. For example, when a sensor is a stereo camera, an object near the vehicle 2 is detected by processing image data which are captured by the stereo camera. Data on the surrounding environment of the vehicle 2 which is detected by the environment detecting unit 22 is output to the travel control unit 23 which will be described later.

The travel control unit 23 generates a control command for controlling autonomous travel of the host vehicle, for example, based on the operation plan which is created by the operation plan control unit 21, the data on the surrounding environment of the vehicle 2 which is generated by the environment detecting unit 22, and the position information of the host vehicle which is acquired by the position information acquiring unit 24. For example, when an operation plan is input from the operation plan control unit 21, the travel control unit 23 determines whether there is an obstacle in a moving direction indicated by the operation plan and secures safety of movement. When it is determined that there is no obstacle in the moving direction, the travel control unit 23 generates a control command such that the host vehicle can travel on a route indicated by the operation plan. The generated control command is transmitted to the driving motor 212. A known method can be employed as the method of generating the control command for causing the vehicle to travel autonomously.

When there is an obstacle in a moving direction, for example, the travel control unit 23 notifies nearby persons of movement of the vehicle 2 by outputting voice or an alarm indicating that the vehicle 2 starts movement in the moving direction from the speaker 214 or outputting a message indicating that movement is started to the display 206 which is provided to face outside from the vehicle. When the vehicle 2 is moved in accordance with an operation plan indicated by a movement command from the central server 1, the travel control unit 23 outputs alarm sound or voice from the speaker 214 to call attention thereof during movement.

FIG. 5 is a diagram illustrating an example of the congestion degree table which is stored in the congestion degree DB 17 of the central server 1. The congestion degree table is a table for defining a degree of congestion. In the example illustrated in FIG. 5, a degree of congestion is defined depending on the number of persons who appear in a captured image which is acquired by analyzing images from the cameras provided in the site. The congestion degree table illustrated in FIG. 5 is based on the premise that a plurality of vehicles 2 has the positional relationship illustrated in FIG. 1.

In the example illustrated in FIG. 5, the degree of congestion is set to four steps including S, A, B, and C and increases in that order. For example, when the average number of persons appearing in one captured image is equal to or greater than 50, the degree of congestion is defined as S. For example, when the average number of persons appearing in one captured image is equal to or greater than 30 and equal to or less than 49, the degree of congestion is defined as A. For example, when the average number of persons appearing in one captured image is equal to or greater than 15 and equal to or less than 29, the degree of congestion is defined as B. For example, when the average number of persons appearing in one captured image is equal to or less than 14, the degree of congestion is defined as C.

In the congestion degree table illustrated in FIG. 5, a vehicle column interval for each degree of congestion is also defined. The vehicle column interval is set to increase as the degree of congestion increases. The vehicle column interval set in the congestion degree table illustrated in FIG. 5 is an example of the positional relationship between the vehicles 2. An initial positional relationship set between a plurality of vehicles 2 may be, for example, a positional relationship corresponding to the lowest degree of congestion.

The data structure of the congestion degree table is not limited to the example illustrated in FIG. 5. For example, in addition to the average number of persons appearing in a captured image, the number of attendees, the number of terminals accessing an access point, or the number of terminals of which a position is registered in a mobile phone base station may be used to define each degree of congestion. When patterns of a positional relationship between the vehicles 2 based on the degree of congestion are stored in the map information DB 15 in advance, identification information of the patterns of the positional relationship may be correlated with the degrees of congestion.

In the congestion degree table illustrated in FIG. 5, the degree of congestion is defined as four steps depending on the average number of persons appearing in a captured image, but the degree of congestion is not limited to stepwise setting. For example, the average number of persons appearing in a captured image, the number of attendees, the number of terminals accessing an access point, or the number of terminals of which a position is registered in a mobile phone base station may be used as the degree of congestion and threshold values therefor may be defined in the congestion degree table.

Flow of Process Routine

Figure 6:
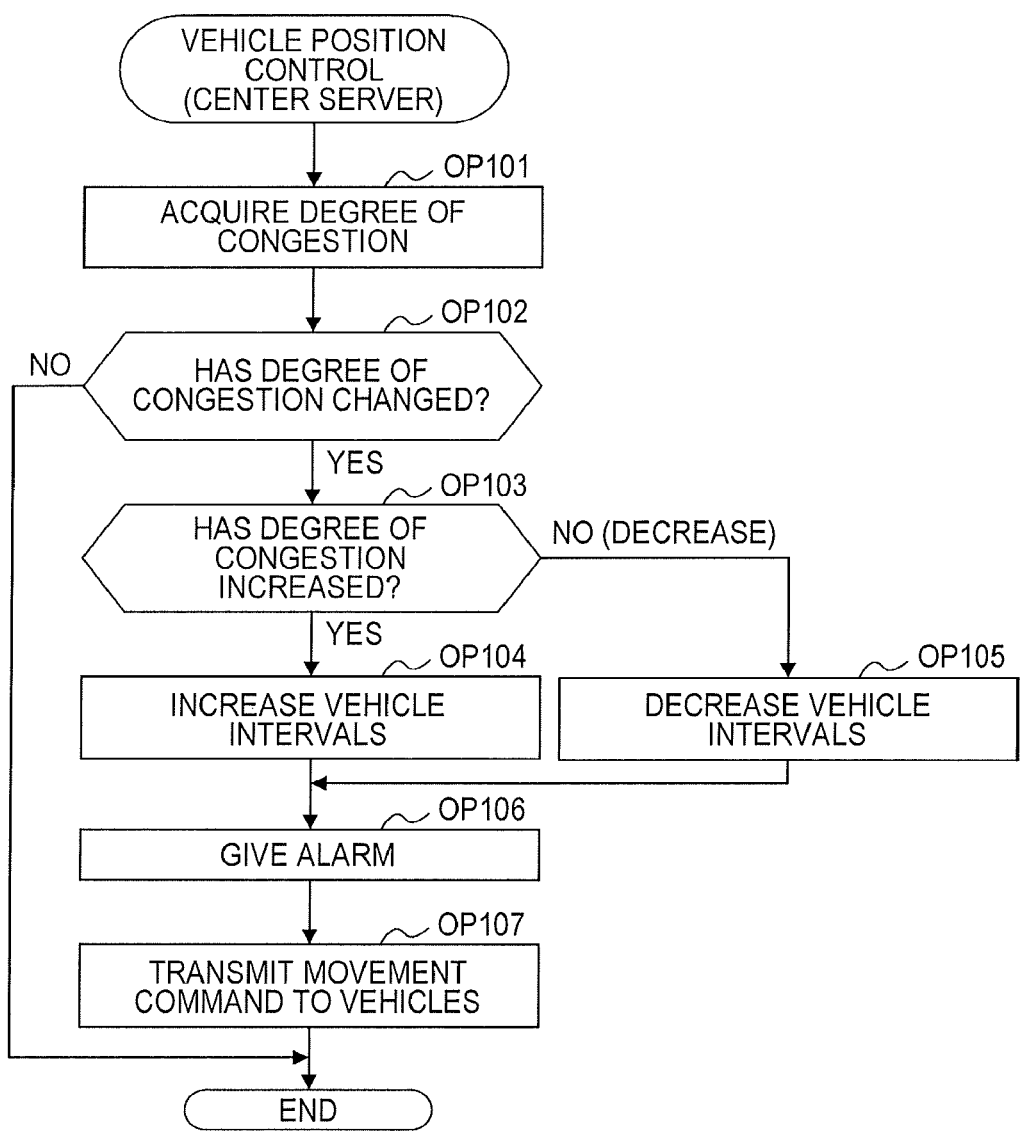
FIG. 6 is a flowchart illustrating an example of a vehicle position control process routine in the central server.

FIG. 6 is a flowchart illustrating an example of a vehicle position control process routine in the central server 1. The process routine illustrated in FIG. 6 is repeatedly performed, for example, at intervals of a predetermined period. An entity that performs the process routine illustrated in FIG. 6 is the CPU 101 of the central server 1, but the position control unit 12 which is a functional unit thereof is described as the entity for the purpose of convenience. The process routine illustrated in FIG. 6 is a process routine based on the assumption that a degree of congestion is defined in the congestion degree table illustrated in FIG. 5.

In OP101, the position control unit 12 acquires a degree of congestion which has been acquired by the congestion degree acquiring unit 11, for example, from a predetermined storage area of the memory 102. In OP102, the position control unit 12 determines whether the degree of congestion has changed from the time of performing the previous vehicle position control process routine. When the degree of congestion has changed (OP102: YES), the process routine progresses to OP103. When the degree of congestion has not changed (OP102: NO), the process routine illustrated in FIG. 6 ends.

In OP103, the position control unit 12 determines whether the degree of congestion has changed to a higher step (increased). When the degree of congestion has increased (OP103: YES), the process routine progresses to OP104. In OP104, the position control unit 12 determines that the positional relationship between the vehicles 2 is set to a positional relationship in which the intervals between the vehicles 2 are greater than those at the present time. For example, the position control unit 12 sets an interval between the columns of the vehicles 2 to a width which is set in the congestion degree table illustrated in FIG. 5 and which is greater than that at the present time.

When the degree of congestion has not increased, that is, when the degree of congestion has changed to a lower step (decreased) (OP103: NO), the process routine progresses to OP105. In OP105, the position control unit 12 determines that the positional relationship between the vehicles 2 is set to a positional relationship in which the intervals between the vehicles 2 are less than those at the present time. For example, the position control unit 12 sets the interval between the columns of the vehicles 2 to a width which is set in the congestion degree table illustrated in FIG. 5 and which is less than that at the present time.

In OP106, the position control unit 12 outputs a warning indicating that movement of the vehicles 2 is started, for example, from the speakers in the site or the speakers 214 of the vehicles 2.

In OP107, the position control unit 12 newly creates a layout drawing of the vehicles 2, for example, based on the positional relationship which is determined in OP104 or OP105, compares the newly created layout drawing with the current layout drawing of the vehicles 2 in the map information DB 15, and identifies the vehicles 2 which are to move or of which a direction is to change. The position control unit 12 transmits a movement command to the identified vehicles 2. Thereafter, the process routine illustrated in FIG. 6 ends. The position control unit 12 stores the layout drawing of the vehicles 2 which is created in OP107 in the map information DB 15.

The vehicle position control process routine is not limited to the process routine illustrated in FIG. 6. For example, the positional relationship between the vehicles 2 based on the degree of congestion may be determined and be compared with the current positional relationship between the vehicles 2, and an alarm is given in the site when the positional relationship has changed, and a movement command may be transmitted to the vehicles 2.

The vehicle position control process routine can be appropriately modified depending on definition of the degree of congestion. For example, when the average number of persons appearing in a captured image or the like is used as a degree of congestion and a threshold value therefor is defined in the congestion degree table, the position control unit 12 may compare the acquired degree of congestion with the threshold value in the congestion degree table and determine the positional relationship between the vehicles 2 depending on a difference from the threshold value.

In the example illustrated in FIG. 6, the newest degree of congestion is used, but the disclosure is not limited thereto and, for example, a degree of congestion which is acquired using information in a predetermined time before the current time may be used. Specifically, when a degree of congestion is defined using the congestion degree table illustrated in FIG. 5, the degree of congestion may be acquired based on the average number of persons appearing in a captured image in a predetermined time before the current time. Accordingly, the degree of congestion can be distributed over time and frequent change in the positional relationship between the vehicles 2 can be suppressed when the degree of congestion is instantaneously increased due to a certain reason.

In the example illustrated in FIG. 6, the vehicle position control process routine is performed at intervals of a predetermined period, but the disclosure is not limited thereto. The vehicle position control process routine may be performed, for example, with new acquisition of a degree of congestion as a trigger.

Figure 7:
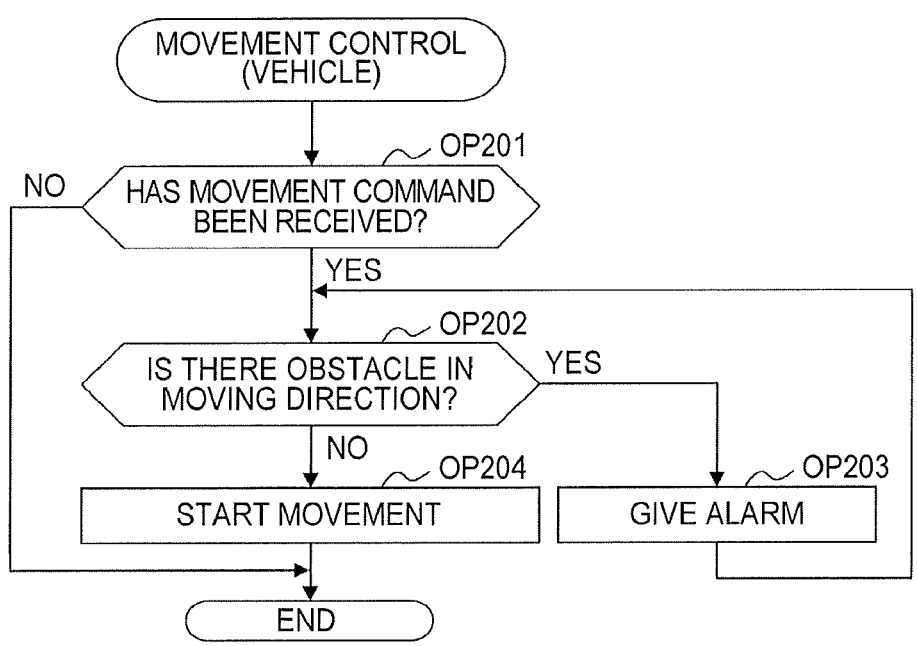
FIG. 7 is a flowchart illustrating an example of a vehicle movement control process routine.

FIG. 7 is a flowchart illustrating an example of a movement control process routine in a vehicle 2. The process routine illustrated in FIG. 7 is repeatedly performed, for example, at intervals of a predetermined period. An entity that performs the process routine illustrated in FIG. 7 is the CPU 201 of the vehicle 2, but the travel control unit 23 which is a functional unit is described as the entity for the purpose of convenience.

In OP201, the travel control unit 23 determines whether a movement command has been received from the central server 1. For example, the determination of OP201 is performed depending on whether an operation plan based on a movement command received from the central server 1 has been input from the operation plan control unit 21. When a movement command has been received from the central server 1 (OP201: YES), the process routine progresses to OP202. When a movement command has not been received from the central server 1 (OP201: NO), the process routine illustrated in FIG. 7 ends.

In OP202, the travel control unit 23 requests the environment detecting unit 22 to acquire surrounding environment information and determines whether there is an obstacle in the moving direction corresponding to the operation plan. When there is an obstacle in the moving direction (OP202: YES), the process routine progresses to OP203. In OP203, the travel control unit 23 outputs warning sound or warning voice from the speaker 214 provided to face the outside to notify the surroundings of movement of the vehicle 2. Thereafter, the process routine progresses to OP202 and an obstacle is detected again.

When there is no obstacle in the moving direction (OP202: NO), the process routine progresses to OP204. In OP204, since safety of movement is secured, the travel control unit 23 starts movement of the vehicle in accordance with the operation plan such that the positional relationship determined based on the degree of congestion by the central server 1 is satisfied. The travel control unit 23 may continue to output warning sound or warning voice from the speaker 214 during movement of the vehicle 2. Thereafter, the process routine illustrated in FIG. 7 ends.

The movement control process for the vehicle 2 is not limited to the process routine illustrated in FIG. 7. The travel control unit 23 of the vehicle 2 may notify the central server 1 of completion of movement after the movement has been completed and thus the central server 1 may detect completion of change of the positional relationship between the vehicles 2. Alternatively, since the vehicles 2 transmit position information thereof to the central server 1 at intervals of a predetermined period, the central server 1 may detect completion of change of the positional relationship between the vehicles 2 from the position information of the vehicles 2.

Specific Example of Positional Relationship Between Vehicles

In the first embodiment, an example in which the width of a passage which is formed by two columns of vehicles 2 is increased as illustrated in FIG. 1 is described as an example of change of the positional relationship between the vehicles 2, but the change of the positional relationship between the vehicles 2 is not limited thereto.

Figure 8:
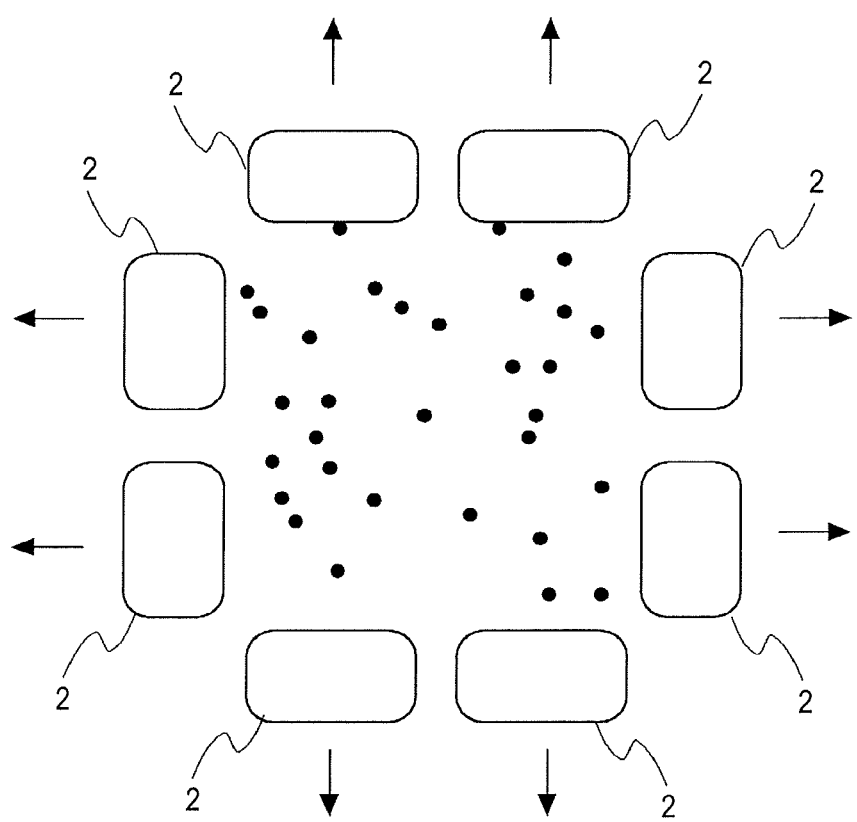
FIG. 8 is a diagram illustrating an example of change in positional relationship between vehicles.

FIG. 8 is a diagram illustrating an example of change of a positional relationship between vehicles 2. In FIG. 8, an example in which an area which is formed by the vehicles 2 is enlarged is illustrated as an example of the change of the positional relationship between the vehicles 2 based on the degree of congestion.

Specifically, in FIG. 8, a plurality of vehicles 2 forms a rectangular shape and is arranged with a positional relationship in which shop surfaces face the inside of the rectangular shape, and persons walk in an area which is surrounded by the vehicles 2. In this case, for example, a degree of congestion is acquired in the area surrounded by the vehicles 2. When the degree of congestion reaches a predetermined threshold value, the central server 1 changes the positional relationship between the vehicles 2, for example, such that the area formed by the vehicles 2 is enlarged.

In the example illustrated in FIG. 8, the positional relationship is determined such that the rectangular shape formed by the vehicles 2 is enlarged, and the vehicles 2 forming the rectangular shape move a predetermined distance to outside from the rectangular shape (in the directions of arrows in FIG. 8). Here, the vehicles 2 of which movement is requested with the change of the positional relationship may include only some vehicles. For example, the rectangular shape is enlarged by causing the vehicles 2 corresponding to two neighboring sides out of the vehicles 2 forming the rectangular shape to move to outside from the rectangular shape. What vehicles 2 are caused to move is determined, for example, based on the area of the site and positions of the vehicles 2 in the site.

Figure 9:
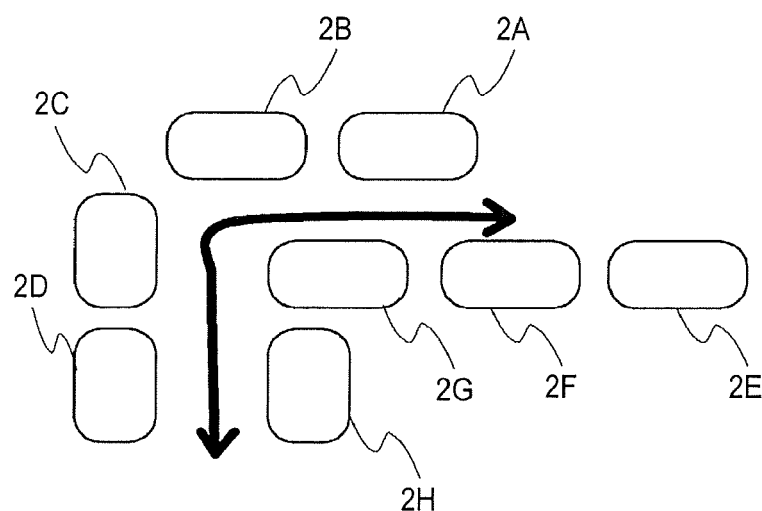
FIG. 9 is a diagram illustrating an example of change in positional relationship between vehicles.
Figure 9:
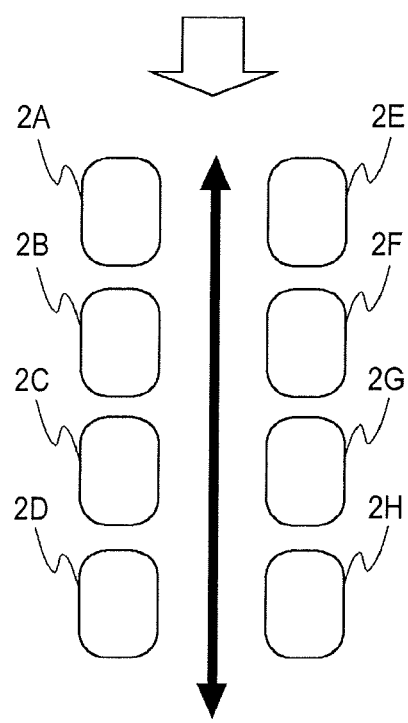

FIG. 9 is a diagram illustrating an example of change of a positional relationship between vehicles 2. In FIG. 9, an example in which a moving line of persons which is formed by the vehicles 2 is changed is illustrated as an example of change of the positional relationship between the vehicles 2 based on a degree of congestion. Specifically, the positional relationship between the vehicles 2 is initially set to a positional relationship in which a passage with a right-bent moving line is formed as illustrated in an upper part of FIG. 9, and is changed to a positional relationship in which a passage with a straight moving line is formed as illustrated in a lower part of FIG. 9 with an increase in the degree of congestion.

When the positional relationship between the vehicles 2 is changed such that a moving line changes depending on the degree of congestion, the central server 1 may store, for example, patterns of the positional relationship between the vehicles 2 based on the degree of congestion in advance.

Operations and Advantages of First Embodiment

In the first embodiment, a positional relationship between vehicles 2 which are mobile shops is changed based on a degree of congestion in a site. For example, when the degree of congestion increases, the positional relationship between the vehicles 2 is changed such that intervals between the vehicles 2 increase. For example, when the degree of congestion decreases, the positional relationship between the vehicles 2 is changed such that the intervals between the vehicles 2 decrease. Accordingly, it is possible to enhance efficiency of movement between the vehicles 2.

In the first embodiment, when the positional relationship between the vehicles 2 changes based on the degree of congestion, the central server 1 and the vehicles 2 which are to move notify the site of movement of the vehicles. Accordingly, it is possible to call attention of persons which are located near the vehicles 2 which are to move.

A vehicle 2 having received a movement command form the central server 1 due to change of the positional relationship between the vehicles 2 based on the degree of congestion starts movement thereof after ascertaining that there is no obstacle in the moving direction. Accordingly, it is possible to secure safety of movement of the vehicles 2.

Other Embodiments

The above-mentioned embodiment is only an example and the disclosure can be appropriately modified without departing from the gist thereof.

In the first embodiment, the positional relationship between all the vehicles 2 changes based on a degree of congestion of the overall site, but the disclosure is not limited thereto and a positional relationship between some vehicles 2 may change based on a local degree of congestion in the site. The degree of congestion and the target range of the positional relationship which is to change are different and the processing method thereof is the same as described in the first embodiment.

The processes or units which have been described above in the present disclosure can be freely combined as long as no technical contradictions arise.

A process which has been described to be performed by a single device may be distributed to and performed by a plurality of devices. Alternatively, processes which have been described by different devices may be performed by a single device. In a computer system, by what hardware configuration (server configuration) each function is to be embodied can be flexibly changed.

The disclosure can also be embodied by supplying a computer program storing the functions described above in the above-mentioned embodiment to a computer and causing one or more processors of the computer to read and execute the computer program. Such a computer program may be provided to the computer via a non-transitory computer-readable storage medium which can access a system bus of the computer or may be provided to the computer via a network. Examples of the non-transitory computer-readable storage medium include an arbitrary type of disk such as a magnetic disk (such as a Floppy (registered trademark) disk or a hard disk drive (HDD)) or an optical disc (such as a CD-ROM, a DVD disc, or a Blu-ray disc), a read only memory (ROM), a random access memory (RAM), an EPROM, an EEPROM, a magnetic card, a flash memory, an optical card, and an arbitrary type of medium which is suitable for storing electronic commands.

What is claimed is:

1. An information processing device comprising a control unit configured to perform:
    acquiring a degree of congestion of persons that are located in a predetermined range, the predetermined range including a plurality of vehicles which is parked at predetermined positions and the plurality of vehicles are able to travel autonomously;
    determining a positional relationship between the plurality of vehicles based on the degree of congestion; and
    transmitting a movement command to a first vehicle which is a vehicle which is requested to move out of the plurality of vehicles such that the determined positional relationship is satisfied.

2. The information processing device according to claim 1, wherein the control unit is configured to determine the positional relationship such that intervals between the plurality of vehicles increase when the degree of congestion increases and to determine the positional relationship such that the intervals between the plurality of vehicles decrease when the degree of congestion decreases.

3. The information processing device according to claim 1, wherein the control unit is configured to notify of at least movement of the first vehicle using a predetermined alarm unit.

4. A vehicle position control system comprising:
   a plurality of vehicles which is parked at predetermined positions in a predetermined range and is able to travel autonomously; and
   an information processing device including a control unit configured to perform:
      acquiring a degree of congestion of persons that are located in the predetermined range;
      determining a positional relationship between the plurality of vehicles based on the degree of congestion; and
      transmitting a movement command to a first vehicle which is a vehicle which is requested to move out of the plurality of vehicles such that the determined positional relationship is satisfied.

5. The vehicle position control system according to claim 4, wherein each of the plurality of vehicles includes an obstacle sensor, and
   wherein the control unit is configured to perform:
      determining whether there is an obstacle in a moving direction using the obstacle sensor before starting movement in response to the movement command; and
      starting movement to a position which is designated by the movement command when it is determined that there is no obstacle in the moving direction.

6. A vehicle position control method comprising:
   acquiring a degree of congestion of persons that are located in a predetermined range, the predetermined range including a plurality of vehicles which is parked at predetermined positions and the plurality of vehicles are able to travel autonomously;
   determining a positional relationship between the plurality of vehicles based on the degree of congestion; and
   transmitting a movement command to a first vehicle which is a vehicle which is requested to move out of the plurality of vehicles such that the determined positional relationship is satisfied.

* * * * *